United States Patent

Lalla et al.

[11] Patent Number: 6,054,946
[45] Date of Patent: Apr. 25, 2000

[54] RADAR-BASED METHOD OF MEASURING THE LEVEL OF A MATERIAL IN A VESSEL

[75] Inventors: Robert Lalla, Lörrach; Roland Müller, Steinen; Michael Sinz, Binzen, all of Germany

[73] Assignee: Endress + Hauser GmbH + Co., Maulburg, Germany

[21] Appl. No.: 09/299,465

[22] Filed: Apr. 26, 1999

[30] Foreign Application Priority Data

May 6, 1998 [EP] European Pat. Off. ............ 98108263

[51] Int. Cl.⁷ .................................................. G01S 13/08
[52] U.S. Cl. ........................ 342/124; 342/135; 342/127
[58] Field of Search ............................ 342/124, 85, 86, 342/102, 127, 135, 195

[56] References Cited

U.S. PATENT DOCUMENTS

| | | |
|---|---|---|
| 4,503,433 | 3/1985 | Tomasi . |
| 4,737,791 | 4/1988 | Jean et al. ................................ 342/124 |
| 4,847,623 | 7/1989 | Jean et al. ................................ 342/124 |
| 5,115,242 | 5/1992 | Nagamune et al. ..................... 342/124 |
| 5,136,299 | 8/1992 | Edvardsson ............................. 342/124 |
| 5,656,774 | 8/1997 | Nelson et al. ............................. 73/290 |

FOREIGN PATENT DOCUMENTS

| | | | |
|---|---|---|---|
| 887658A1 | 9/1998 | European Pat. Off. ........ G01S 13/38 |
| 9838525A1 | 9/1998 | WIPO ............................... G01S 7/40 |

*Primary Examiner*—John B. Sotomayor
*Attorney, Agent, or Firm*—Bose McKinney & Evans LLP

[57] ABSTRACT

For measuring the level of a material in a vessel by a radar-based method an antenna arranged above the highest level anticipated radiates electromagnetic waves to the surface of the material contained in the vessel and receives reflected echo waves. The transit time of the wanted echo waves reflected by the material surface is measured from which the level is computed. Since this transit time corresponds to the group delay, for determining the reduction factor by which the group velocity of the electromagnetic waves differs from the velocity of propagation in the free space due to the geometry of the propagation space the phase difference of the wanted echo waves relative to a reference oscillation and the group delay are measured for various levels and the reduction factor is determined on the basis of the changes in the phase difference as a function of the group delay.

7 Claims, 2 Drawing Sheets

RADAR-BASED METHOD OF MEASURING THE LEVEL OF A MATERIAL IN A VESSEL

BACKGROUND OF THE INVENTION

1. Field of the Invention

The invention relates to a radar-based method of measuring the level of a material in a vessel in which an antenna arranged above the highest level anticipated radiates electromagnetic waves to the surface of the material contained in the vessel and receives reflected echo waves and in which the transit time corresponding to the group delay of the wanted echo waves reflected by the material surface is measured, from which the level is computed.

2. Description of the Prior Art

In prior art methods of this kind, level measuring is based on the product of the measured transit time and the velocity of propagation of the electromagnetic waves equalling twice the distance between the antenna and the material surface, since this distance is travelled twice by the electromagnetic waves. The level is thus given by the difference between the known installation height of the antenna and the distance as determined by measuring.

The prerequisite for this method of measuring is that the velocity of propagation of the electromagnetic waves is known, this being assumed in most cases to be the speed of light in air. This assumption is admissible when the transverse dimensions of the space in which the electromagnetic waves propagate are large as compared to the wavelength of the electromagnetic waves. Since the resolution of level measuring depends on the wavelength of the electromagnetic waves this is usually done with microwaves so that the above prerequisite is satisfied as a rule where large vessels are concerned.

When, however, measuring is done in a tube inserted in the vessel and the tube has a diameter which is small as compared to the wavelength, for example in a so-called surge tube, or when the vessel itself has a correspondingly small diameter, the above assumption is no longer admissible. A tube or vessel of small diameter in which electromagnetic waves propagate acts like a waveguide. The group velocity of electromagnetic waves in a waveguide depends on the geometry thereof and is smaller by a factor, termed the reduction factor, than the speed of light. The group velocity is the velocity at which the energy is transferred in the waveguide. When measuring the transit time is done, as usual, on the basis of the amplitude of the reflected echo waves the measured transit time is the group delay. The reduction factor is typically of the order of 0.7 to 1.0, and thus ignoring the reduction factor, i.e. the assumption that it always equals 1.0 may thus result in serious measuring errors. This is why it is particularly in the case of high-accuracy measuring that precisely knowing the reduction factor is important.

In conventional methods of level measuring using microwaves in which the reduction factor is to be taken into account, a calibration is done before commencing measuring, this involving measuring the transit time with the vessel empty or with a precisely known level. However, this calibration is not possible when measuring needs to be commenced with the vessel partly filled, the level of which is not known precisely. Furthermore, once-only calibration may not be sufficient to establish whether or not the reduction factor changes in the course of time or differing reduction factors exist in various portions of the vessel.

SUMMARY OF THE INVENTION

The object of the invention is to provide a method permitting precise determination of the reduction factor during operation without a separate calibration being necessary. For achieving this object the invention provides a radar-based method of measuring the level of a material in a vessel in which an antenna arranged above the highest level anticipated radiates electromagnetic waves to the surface of the material contained in the vessel and receives reflected echo waves and in which the transit time corresponding to the group delay of the wanted echo waves reflected by the material surface is measured from which the level is computed, wherein for determining the reduction factor by which the group velocity of the electromagnetic waves differs from the velocity of propagation in the free space due to the geometry of the propagation space, the difference in phase of the wanted echo waves relative to a reference oscillation and the group delay for various levels are measured and the reduction factor determined on the basis of the changes in the difference in phase as a function of the group delay.

The method in accordance with the invention makes use of the fact that the group velocity and the phase velocity of electromagnetic waves differ from each other in a waveguide but relate to each other by a known ratio corresponding to the square of the reduction factor. Since the change in phase of the electromagnetic waves occurs at the phase velocity the reduction factor may be determined from the change in phase difference as measured at various levels and the change in group delay as measured at the same levels, the only prerequisite for determining the reduction factor being that the level needs to change which is a matter of course in level measurement.

BRIEF DESCRIPTION OF THE DRAWING

Further features and advantages of the invention read from the following description of example embodiments with reference to the drawings in which.

DESCRIPTION OF THE PREFERRED EMBODIMENTS

Figure 1:
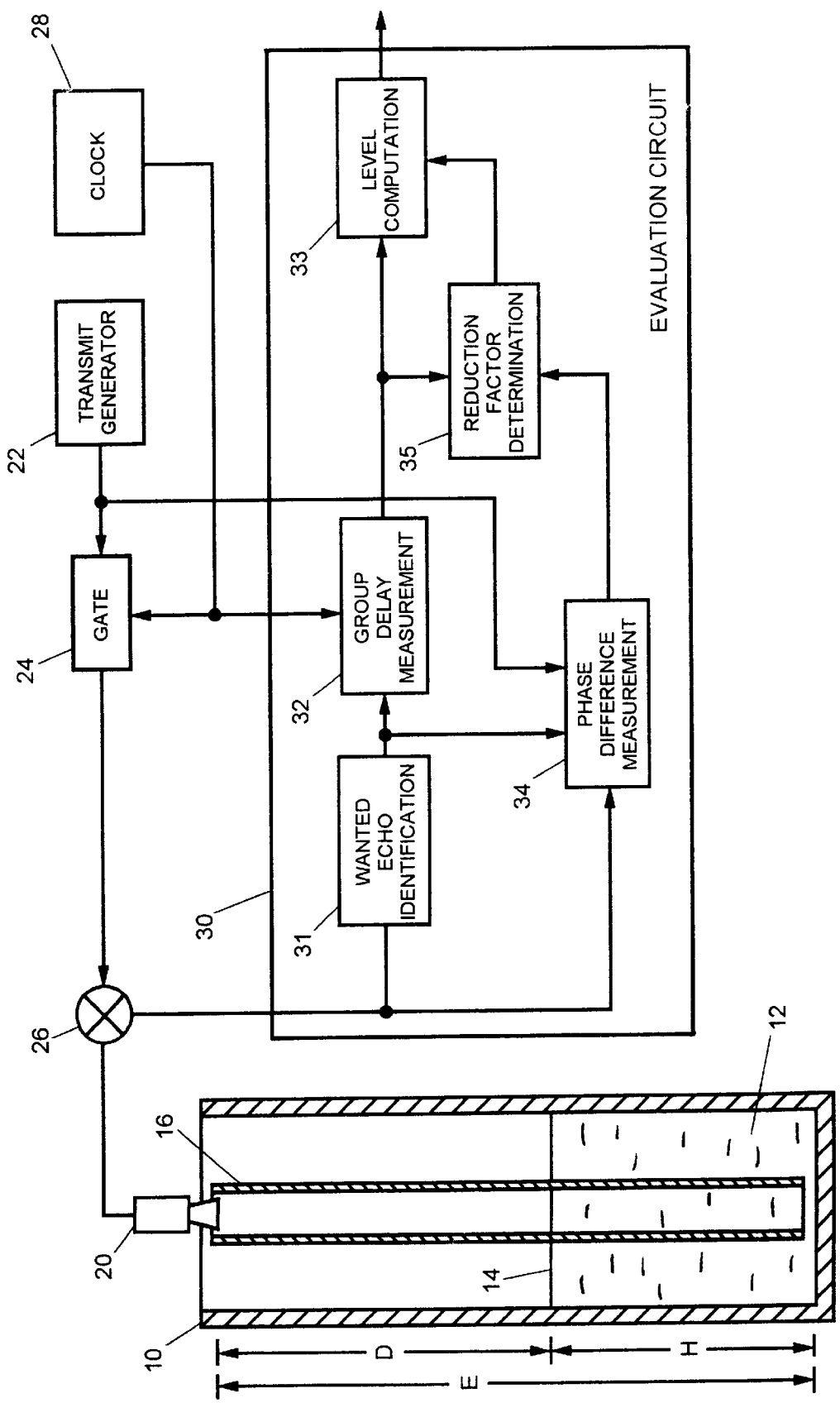
FIG. 1 is a schematic block diagram of an arrangement for radar-based level measuring.

Referring now to FIG. 1 there is illustrated schematically a block diagram of an arrangement for level measuring, operating with microwaves in accordance with the pulse delay method in a vessel 10 partly filled with a liquid 12. The height H of the liquid surface 14 above the bottom of the vessel 10 is the level to be measured. Level measuring is done not in the vessel as a whole but in a relatively narrow tube 16 extending practically over the full height of the vessel 12 and which is open at the bottom end so that it is likewise filled with the liquid 12 up to the height H.

For level measuring, an antenna 20 is arranged above the highest level anticipated such that it is able to emit microwaves into the interior of the tube 16 and receive the echo waves reflected from the surface 14 of the material. A transmit generator 22 continually generates a high-frequency oscillation having the frequency of the microwaves to be emitted. The output of the transmit generator 22 is connected to the antenna 20 via a gate circuit 24 and a duplexer 26. A clock 28 generates periodic transmit clock pulses applied to the control input of the gate circuit 24, every output clock pulse briefly opening the gate circuit so that the high-frequency oscillation generated by the transmit generator 22 is applied to the antenna 20 for a brief transmission interval, the antenna 20 thus emitting a short microwave pulse in every cycle of the transmit clock. The microwave pulse propagates through the tube 16 to the surface 14 of the liquid 12 and the microwaves reflected from the liquid surface 14 return as an echo pulse to the antenna 20. This echo pulse is received in the receiving time interval adjoining the short transmitting time interval in every transmit clock cycle.

All microwave signals received by the antenna 20 in each receiving interval are fed via the duplexer 26 to an evaluation circuit 30. In addition to containing the wanted echo pulse reflected at the surface 14 these microwave signals may also contain noise signals. In a function block 31 of the evaluation circuit 30 the wanted echo pulse is first identified. This may be done in accordance with a usual method by the envelope curve of the microwave signals received in the full receiving interval being formed. This envelope curve represents the received signal amplitude as a function of time and forms the so-called echo function which may be stored, for example, digitized. Identifying the wanted echo pulse is done by analysis of the amplitude profile of the echo function in accordance with given criteria, for example, by determining the maximum amplitude value in taking into account the attenuation of the echo signal as a function of its transit time.

In a function block 32 the transit time of the wanted echo pulse is then determined. The function block 32 receives for this purpose, on the one hand, the transmit clock pulses furnished by the clock 28 and, on the other, from function block 31 a signal indicating the point in time of receiving a salient point in the wanted echo pulse determined in the echo function. This salient point may be, for example, the peak value of the wanted echo pulse or a point at which the signal value is down from the peak value by a given value, for example, 3 dB down. The function block 32 measures in each cycle of the transmit clock the time spacing between the occurrence of the transmit clock pulse emitted by the clock 28 and the point in time of receipt of the selected salient point of the wanted echo pulse. This time spacing is representative of the transit time of the microwaves from the antenna 20 to the material surface 14 and back again to the antenna 20.

The function block 32 furnishes to a function block 33 a signal indicating the measured transit time τ. The function block 33 computes from the measured transit time τ firstly the distance D of the material surface 14 from the antenna 20 according to the formula $$D = \frac{1}{2} \cdot v \cdot \tau \quad (1)$$

where v is the velocity of propagation of the microwaves. The factor ½ takes into account that the microwaves cover the distance D twice. From the computed distance D and the known installation height E of the antenna 20 above the bottom of the vessel 10 the wanted level H then results from the relationship $$H = E - D \quad (2)$$

The portion of the evaluation circuit 30 described hitherto corresponds to the usual configuration of level measuring systems employing microwaves in accordance with the pulse delay method. In such systems it is usually assumed that the velocity of propagation of the microwaves in travelling between the antenna 20 and the material surface 14 corresponds to the speed of light c in air.

This assumption no longer applies, however, when the microwaves, as illustrated in FIG. 1, propagate in a tube of small diameter or when the vessel itself has a correspondingly small diameter. A tube or vessel having a small diameter in which microwaves propagate acts like a waveguide. Microwaves propagate in a waveguide with a group velocity $v_{Gr}$ which is smaller than the speed of light c in air by a reduction factor $F_R$:

$$v_{Gr} = F_R \cdot c \quad (3)$$

The reduction factor $F_R$ depends on the wavelength of the microwaves and on the geometry of the waveguide and in level measuring applications has a value typically between 0.7 and 1.0.

On the other hand, the phase velocity $v_{ph}$ of the microwaves in a waveguide is greater than the speed of light c in air by the reciprocal of the reduction factor $F_R$:

$$v_{Ph} = \frac{1}{F_R} \cdot c \quad (4)$$

The group velocity $v_{Gr}$ is the velocity at which the energy propagates in the waveguide. Since in the function block 32 of the evaluation circuit 30 as shown in FIG. 1 the time spacing between microwave emission and arrival of a predetermined amplitude value is measured, the measured time spacing is the group delay $\tau_{Gr}$ corresponding to propagation at the group velocity $v_{Gr}$:

$$\tau_{Gr} = \frac{2D}{v_{Gr}} = \frac{2D}{c} \cdot \frac{1}{F_R} \quad (5)$$

and accordingly the wanted distance results from the measured group delay $\tau_{Gr}$ to be $$D = \frac{1}{2} \cdot \tau_{Gr} \cdot v_{Gr} = \frac{1}{2} \cdot \tau_{Gr} \cdot F_R \cdot c \quad (6)$$

Thus, for precise computation of the level in the function block 33 the reduction factor $F_R$ needs to be known, The phase delay $\tau_{Ph}$ occurring at twice the distance D is correspondingly given by $$\tau_{Ph} = \frac{2D}{v_{Ph}} = \frac{2D}{c} \cdot F_R \quad (7)$$

The evaluation circuit 30 as shown in FIG. 1 is configured such that the actual reduction factor $F_R$ may be established in on-going operation at any time and taken into account in computing the level from the measured group delay $\tau_{Gr}$.

For this purpose the evaluation circuit 30 contains two further function blocks 34 and 35. In function block 34 the phase difference φ is measured which the received microwave signal has relative to a reference oscillation at the instant for which the group delay $\tau_{Gr}$ is determined in function block 32. This instant is signalled to the function block 34 by the output signal of function block 31. The reference oscillation has preferably precisely the same frequency as the emitted microwave; in the example embodiment as shown in FIG. 1 the high-frequency oscillation generated by the transmit generator 22 is used as the reference oscillation and applied to function block 34. The phase difference $\phi$ may be established, of course, only up to multiples of $2\pi$, i.e. mod $2\pi$ (modulo $2\pi$). The established phase difference $\phi$ mod $2\pi$ is signalled to the function block 35 which also receives the measured group delay $\tau_{Gr}$ from function block 32. Each pair of values of a measured group delay $\tau_{Gr}$ and a measured phase difference $\phi$ mod $2\pi$ corresponds to a specific travelled distance 2 D, i.e. a specific level H. When the level H changes, the measured values of the group delay $\tau_{Gr}$ and the phase difference $\phi$ mod $2\pi$ change. In operation of a level measuring system the level H and thus the distance D often change as a rule, a fact that is exploited in determining the reduction factor $F_R$ in the evaluation circuit 30 as shown in FIG. 1. For this purpose the reduction factor $F_R$ is computed in the function block 35 and supplied to function block 33 in which it is used for correcting the level computation. This computation is done on the basis of pairs of values of the phase difference $\phi$ mod $2\pi$ and the group delay $\tau_{Gr}$ corresponding to various levels, by one of the methods as described in the following.

Method A

Figure 2:
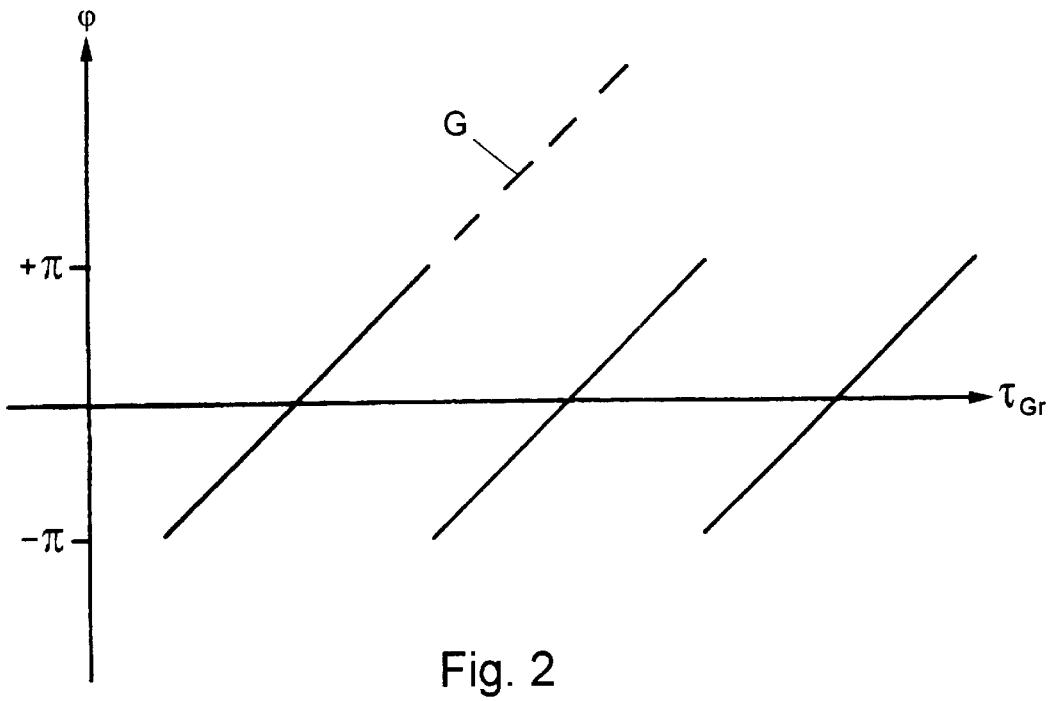
FIG. 2 is a graph explaining how the reduction factor is determined in accordance with a first embodiment of the method.

In function block 35 associated pairs of values for the group delay $\tau_{Gr}$ and the phase difference $\phi$ mod $2\pi$ are recorded. When the phase differences $\phi$ mod $2\pi$ are plotted as a function of the group delay $\tau_{Gr}$ the solid curve as shown in FIG. 2 is obtained. The phase difference $\phi$ changes cyclically with the group delay $\tau_{Gr}$, the cycle length corresponding roughly to the reciprocal of the reference frequency. When converted into a spatial distance a cycle corresponds to a wavelength, this being a few centimeters in the case of a frequency of a few gigahertz. After each cycle the phase difference $\phi$ shifts by $2\pi$, this being from $+\pi$ to $-\pi$ in the plot as shown in FIG. 2.

In a next step the phase shifts are eliminated by plausibility considerations. If a large difference in the phase difference occurs for a small difference in the transit time, this means that a phase shift exists which is corrected by the addition or subtraction of $2\pi$ or multiples of $2\pi$. The starting point, i.e. the material level at which this correction is commenced is irrelevant. This procedure results in a continuous straight line as indicated in FIG. 2 by G.

To avoid uncertainty as to the number of phase shifts between two measurements in sequence an estimated value for the maximum rate of change in the level is preferably assumed. The time spacing $\Delta t$ between two measurements in sequence needs to be sufficiently slight so that the quotient of the wavelength $\lambda$ divided by the time spacing $\Delta t$ is large as compared to the maximum rate of change $v_{max}$ in level:

$$\frac{\lambda}{\Delta t} \gg v_{max} \tag{8}$$

When the level changes by a distance $\Delta x$ the group delay $\tau_{Gr}$ and the phase difference $\phi$ change by corresponding values $\Delta\tau_{Gr}$ and $\Delta\phi$, respectively. In case the reference frequency $\omega_{ref}$ equals the emitted frequency $\omega_S$ $$\omega_{ref} = \omega_S = \omega \tag{9}$$

then the following equations apply:

$$\Delta x = \frac{1}{2} \cdot \frac{\Delta\varphi}{\omega} \cdot c \cdot \frac{1}{F_R} \tag{10}$$

$$\Delta x = \frac{1}{2} \cdot \Delta\tau_{Gr} \cdot c \cdot F_R \tag{11}$$

Equating the two equations for $\Delta x$ obtains the slope m of the straight line G:

$$m = \frac{\Delta\varphi}{\Delta\tau_{Gr}} = F_R^2 \cdot \omega \tag{12}$$

The slope of the straight line is established preferably by a statistical method, for example, by the least square method. It is good practice to group together cluster points in order to eliminate statistical sources of error, this being particularly of advantage when the level changes only a little over a lengthy period of time.

From the slope m of the straight line G and the frequency $\omega$ the reduction factor $F_R$ may be obtained as follows:

$$F_R = \sqrt{\frac{m}{\omega}} = \sqrt{\frac{\Delta\varphi/\Delta\tau_{Gr}}{\omega}} \tag{13}$$

Method B

Here, the same as in method A, the changes in the level are tracked and the pairs of values of the group delay $\tau_{Gr}$ and the phase difference $\phi$ mod $2\pi$ associated to each level are measured, but unlike method A for each measured phase difference $\phi$ the associated phase delay $\tau_{Ph}$ $$\tau_{Ph} = \frac{\varphi}{\omega} \tag{14}$$

is determined in function block 35, this phase delay $\tau_{Ph}$ also being known only mod $2\pi/\omega$.

In this method the reduction factor $F_R$ is not obtained from associated pairs of values for the group delay $\tau_{Gr}$ and the phase difference $\phi$, but from associated pairs of values for the group delay $\tau_{Gr}$ and the difference $\tau_{Gr}-\tau_{Ph}$ between the group delay $\tau_{Gr}$ and the phase delay $\tau_{Ph}$. This difference $\tau_{Gr}-\tau_{Ph}$ is likewise known only mod $2\pi/\omega$. For covering a distance x twice, the following equations apply:

$$\tau_{Gr} = 2 \cdot \frac{x}{v_{Gr}} = 2 \cdot \frac{x}{c} \cdot \frac{1}{F_R} \tag{15}$$

$$\tau_{Ph} = 2 \cdot \frac{x}{v_{Ph}} = 2 \cdot \frac{x}{c} \cdot F_R \tag{16}$$

$$(\tau_{Gr} - \tau_{Ph}) \bmod \frac{2\pi}{\omega} = \left[2 \cdot \frac{x}{c} \cdot \left(\frac{1}{F_R} - F_R\right)\right] \bmod \frac{2\pi}{\omega} \tag{17}$$

Figure 3:
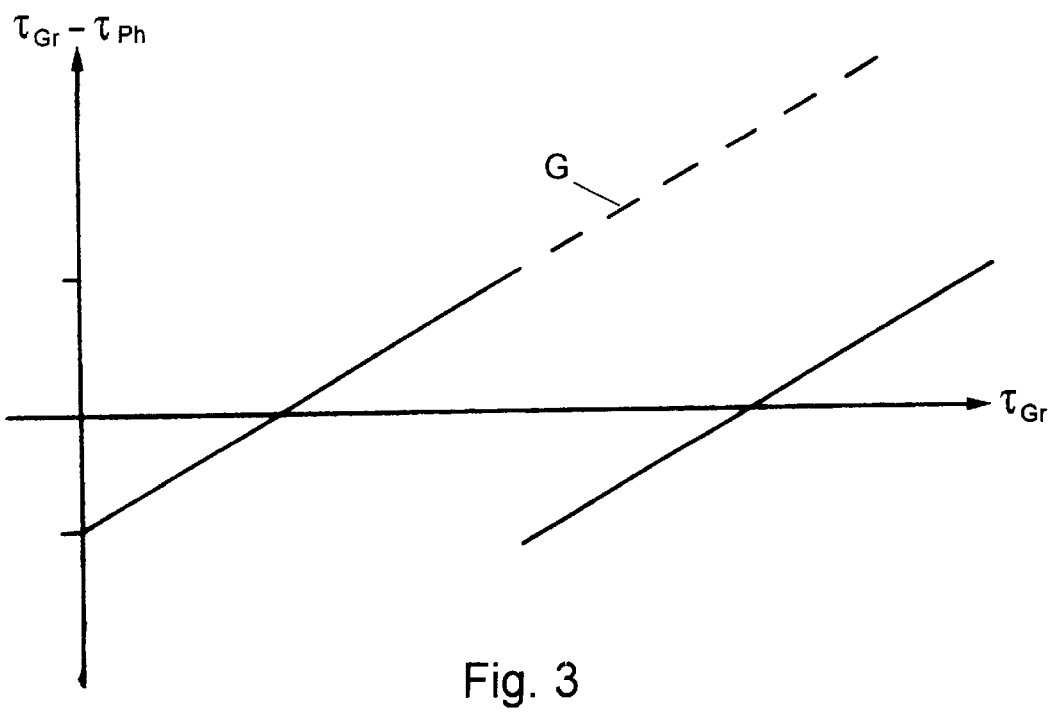
FIG. 3 is a graph explaining how the reduction factor is determined in accordance with a second embodiment of the method.

Plotting this difference as a function of $\tau_{Gr}$ produces the curve as shown in FIG. 3. This curve has the same profile as the curve in FIG. 2 plotted in accordance with method A except that the period T is much longer, it being given by $$T = \frac{1}{\omega \cdot (1 - F_R^2)} \tag{18}$$

Converted into a spatial distance a cycle at a frequency of a few gigahertz corresponds roughly to one meter. A phase shift will always occur when the difference in delay between the signal components propagating at the phase velocity and those propagating at the group velocity is greater than one cycle of the reference frequency.

As in method A the phase shifts are eliminated by plausibility considerations, as a result of which the straight portions are linked in sequence into a continuous straight line G. To avoid uncertainties as regards the number of phase shifts between consecutive measurements an estimated value is preferably assumed for the maximum rate of change in level. The time spacing $\Delta t$ between two measurements in sequence needs to be sufficiently small so that the quotient of the wavelength $\lambda$ divided by the time spacing $\Delta t$ is large as compared to the maximum rate of change in level.

When the level changes by a distance $\Delta x$ the group delay $\tau_{Gr}$ and the phase delay $\tau_{Ph}$ change by corresponding values $\Delta \tau_{Gr}$ and $\Delta \tau_{Ph}$, respectively:

$$\Delta \tau_{Gr} = 2 \cdot \frac{\Delta x}{c} \cdot \frac{1}{F_R} \quad (19)$$

$$\Delta \tau_{Ph} = 2 \cdot \frac{\Delta x}{c} \cdot F_R \quad (20)$$

The difference $\tau_{Gr} - \tau_{Ph}$ accordingly changes by:

$$\Delta \tau_{Gr} - \Delta \tau_{Ph} = 2 \cdot \frac{\Delta x}{c} \cdot \left( \frac{1}{F_R} - F_R \right) \quad (21)$$

The slope m of the straight line G as shown in FIG. 3 is $$m = \frac{\Delta \tau_{Gr} - \Delta \tau_{Ph}}{\Delta \tau_{Gr}} = 1 - F_R^2 \quad (22)$$

The slope m of the straight line G is preferably established by a statistical method, for example by the least square method. It is good practice to group cluster points together to eliminate statistical sources of error, this being particularly of advantage when the level changes only slightly over a lengthy period of time.

From the slope m of the straight line G the reduction factor $F_R$ may be computed as follows:

$$F_R = \sqrt{1-m} = \sqrt{1 - \frac{\Delta \tau_{Gr} - \Delta \tau_{Ph}}{\Delta \tau_{Gr}}} \quad (23)$$

If an approximate value $F_{Rn}$ is already known for the reduction factor, for example, from an earlier measurement or from an estimate, a modification of the method B involves, instead of using the difference $\tau_{Gr} - \tau_{Ph}$ between the group delay $\tau_{Gr}$ and the phase delay $\tau_{Ph}$, using the difference $$\tau_{Gr} - \tau_{Ph} \cdot \frac{1}{F_{Rn}^2} \quad (24)$$

between the group delay $\tau_{Gr}$ and the phase delay $\tau_{Ph}$ multiplied by the reciprocal of the square of the approximation value $F_{Rn}$. Plotting this difference as a function of the group delay $\tau_{Gr}$ produces a plot having a profile similar to that of FIG. 3, except that the slope of the straight line segments becomes less with increasing precision of the approximation value $F_{Rn}$. When the approximation value $F_{Rn}$ differs from the actual value $F_R$ by a factor $\epsilon$:

$$F_R = F_{Rn} \cdot \epsilon \quad (25)$$

then the change in the group delay $\Delta \tau_{Gr}$ and in the phase delay $\Delta_{Ph}$ for a change in the level by $\Delta x$ is:

$$\Delta \tau_{Gr} = 2 \cdot \frac{\Delta x}{c} \cdot \frac{1}{F_{Rb} \cdot \varepsilon} \quad (26)$$

$$\Delta \tau_{Ph} = 2 \cdot \frac{\Delta x}{c} \cdot F_{Rn} \cdot \varepsilon \quad (27)$$

In this case the slope m of the straight line G is $$m = \frac{\Delta \tau_{Gr} - \Delta \tau_{Ph} \cdot \frac{1}{F_{Rn}^2}}{\Delta \tau_{Gr}} = \frac{2 \cdot \frac{\Delta x}{c} \cdot \frac{1}{F_{Rn}} \cdot \left( \frac{1}{\varepsilon} - \varepsilon \right)}{2 \cdot \frac{\Delta x}{c} \cdot \frac{1}{F_{Rn} \cdot \varepsilon}} = 1 - \varepsilon^2 \quad (28)$$

from which the factor $\epsilon$ may be computed as follows:

$$\varepsilon = \sqrt{1 - \frac{\Delta \tau_{Gr} - \Delta \tau_{Ph} \cdot \frac{1}{F_{Rn}}}{\Delta \tau_{Gr}}} \quad (29)$$

The reduction factor $F_R$ results from the approximation value $F_{Rn}$ and the factor e according to the formula (25).

This variant has the advantage that for computing the reduction factor recourse may be made to measurement data and program elements which exist in any case for the actual level measuring.

Of course, the function blocks as evident from FIG. 1 which implement the various measurements and calculations are not formed by discrete circuits but by correspondingly programming a microcomputer, this applying in particular to the function block 35 which receives the pairs of measured values for the group delay $\tau_{Gr}$ and the phase difference $\phi$ and analyzes them in accordance with one of the methods as described.

Each of the methods as described enables the reduction factor to be computed without the actual level being known. In addition, any changes in the reduction factor in operation due to, for example, encrustations may be recognized and compensated accordingly. Furthermore, determining differing reduction factors for various portions of the vessel is also possible.

The methods as described above may also be put to use in time domain reflectometry (TDR) level measuring in which the microwave pulses run along a line (Goubau line) extending into the vessel and are reflected at the surface of the material in the vessel as is known for example from the German publication DE 44 04 745 C2, since on such a Goubau line too, the microwaves are propagated with group and phase velocities other than the speed of light in air.

What is claimed is:

1. A radar-based method of measuring the level of a material in a vessel in which an antenna arranged above the highest level anticipated radiates electromagnetic waves to the surface of the material contained in the vessel and receives reflected echo waves and in which the transit time corresponding to the group delay of the wanted echo waves reflected by the material surface is measured from which the level is computed, wherein for determining the reduction factor by which the group velocity of the electromagnetic waves differs from the velocity of propagation in the free space due to the geometry of the propagation space, the difference in phase of the wanted echo waves relative to a reference oscillation and the group delay for various levels are measured and the reduction factor determined on the basis of the changes in the difference in phase as a function of the group delay.

2. The method as set forth in claim 1, wherein the reduction factor is computed from the slope of the curve representing the phase difference as a function of the group delay.

3. The method as set forth in claim 2, wherein ambiguities in the function values known only modulo $2\pi$ are eliminated by plausibility considerations.

4. The method as set forth in claim 1, wherein from each measured phase difference the corresponding phase delay is computed and the reduction factor is computed from the slope of the curve representing the difference between the group delay and the phase delay as a function of the group delay.

5. The method as set forth in claim 4, wherein ambiguities in the function values known only modulo $2\pi/\omega$ are eliminated by plausibility considerations.

6. The method as set forth in claim 1, wherein from each measured phase difference the corresponding phase delay is computed and the reduction factor is computed from the slope of the curve representing the difference between the group delay and the phase delay multiplied by the square of the reciprocal of an approximation value of the reduction factor as a function of the group delay.

7. The method as set forth in claim 6, wherein ambiguities in the function values known only modulo $2\pi/\omega$ are eliminated by plausibility considerations.

* * * * *